April 21, 1953 T. R. SMITH 2,635,446
CONTROL MECHANISM FOR WASHING MACHINES AND THE LIKE
Original Filed Dec. 20, 1948 7 Sheets-Sheet 2
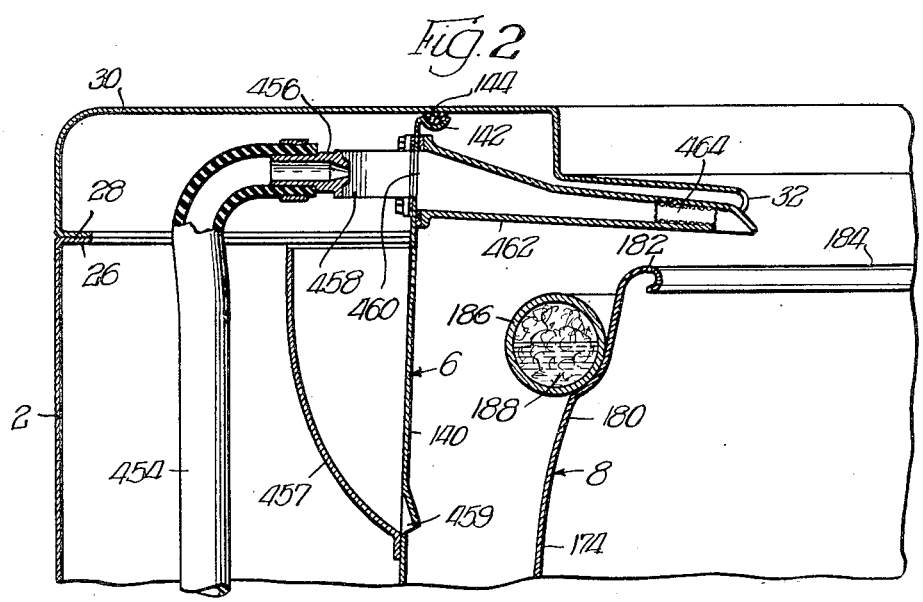
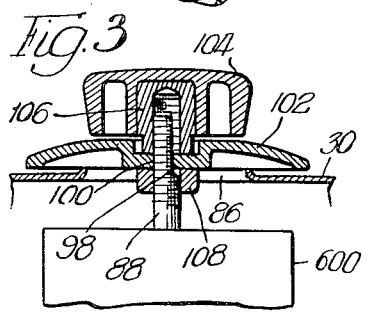
INVENTOR.
Thomas R. Smith,
BY
Wilkinson, Huxley, Byron & Hume
Attys.

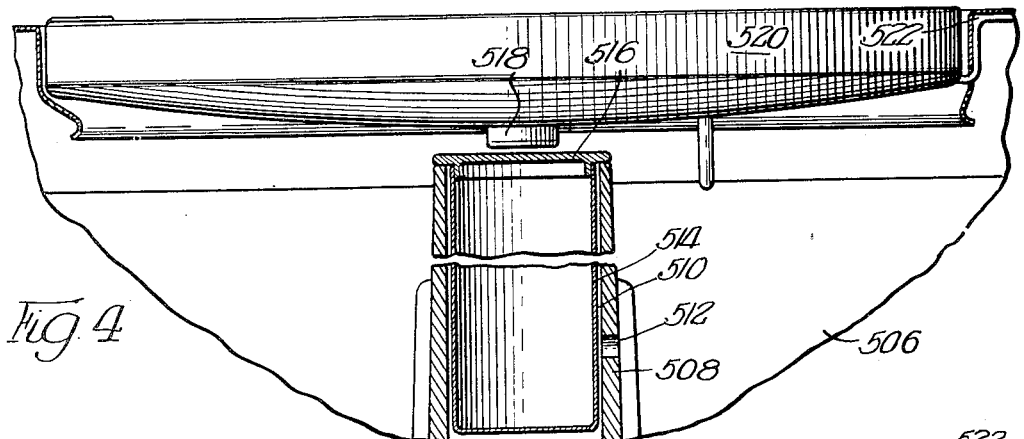
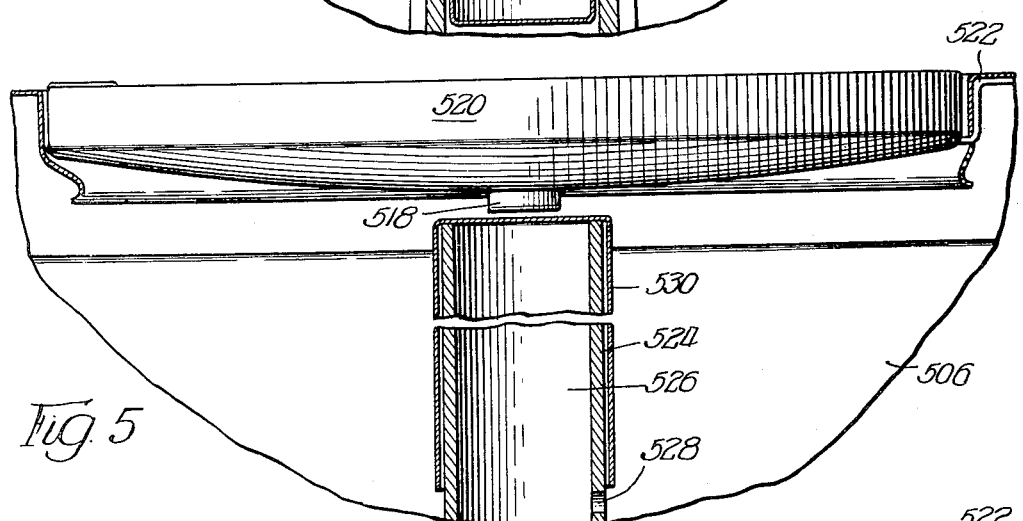
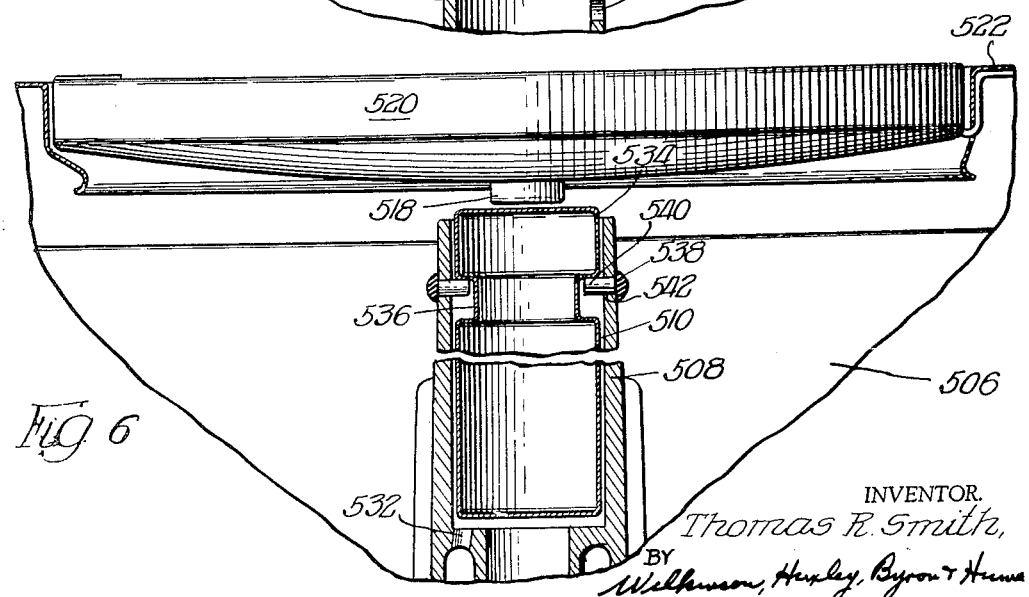

April 21, 1953     T. R. SMITH     2,635,446
CONTROL MECHANISM FOR WASHING MACHINES AND THE LIKE
Original Filed Dec. 20, 1948     7 Sheets—Sheet 4

INVENTOR.
Thomas R. Smith,
BY Wilkinson, Huxley, Byron & Hume
ATTORNEYS.

April 21, 1953 T. R. SMITH 2,635,446
CONTROL MECHANISM FOR WASHING MACHINES AND THE LIKE
Original Filed Dec. 20, 1948 7 Sheets-Sheet 5
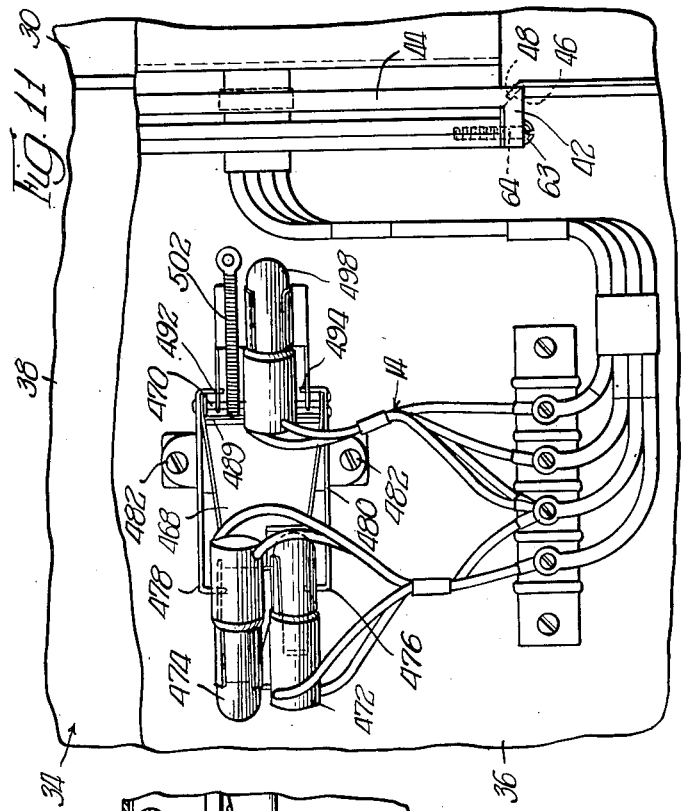
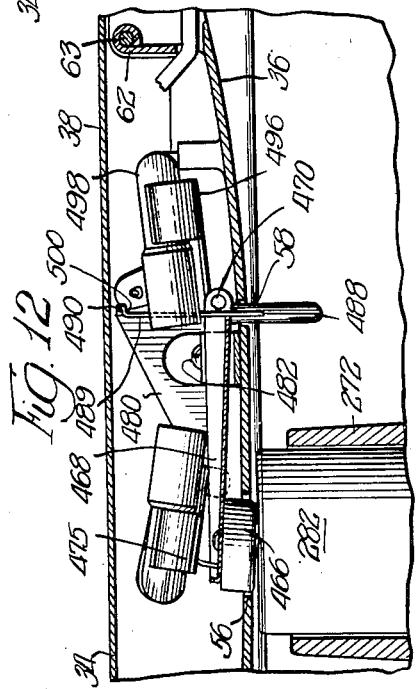
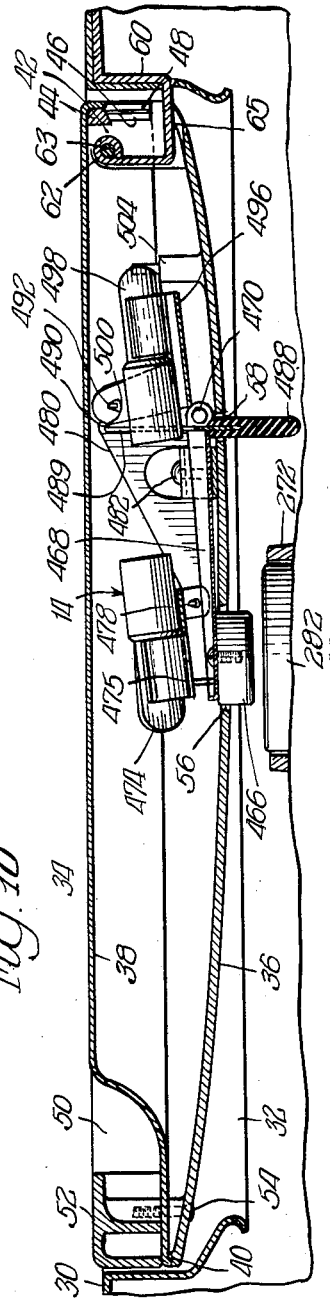
INVENTOR.
Thomas R. Smith,
BY
Wilkinson, Huxley, Byron & Hume
ATTYS.

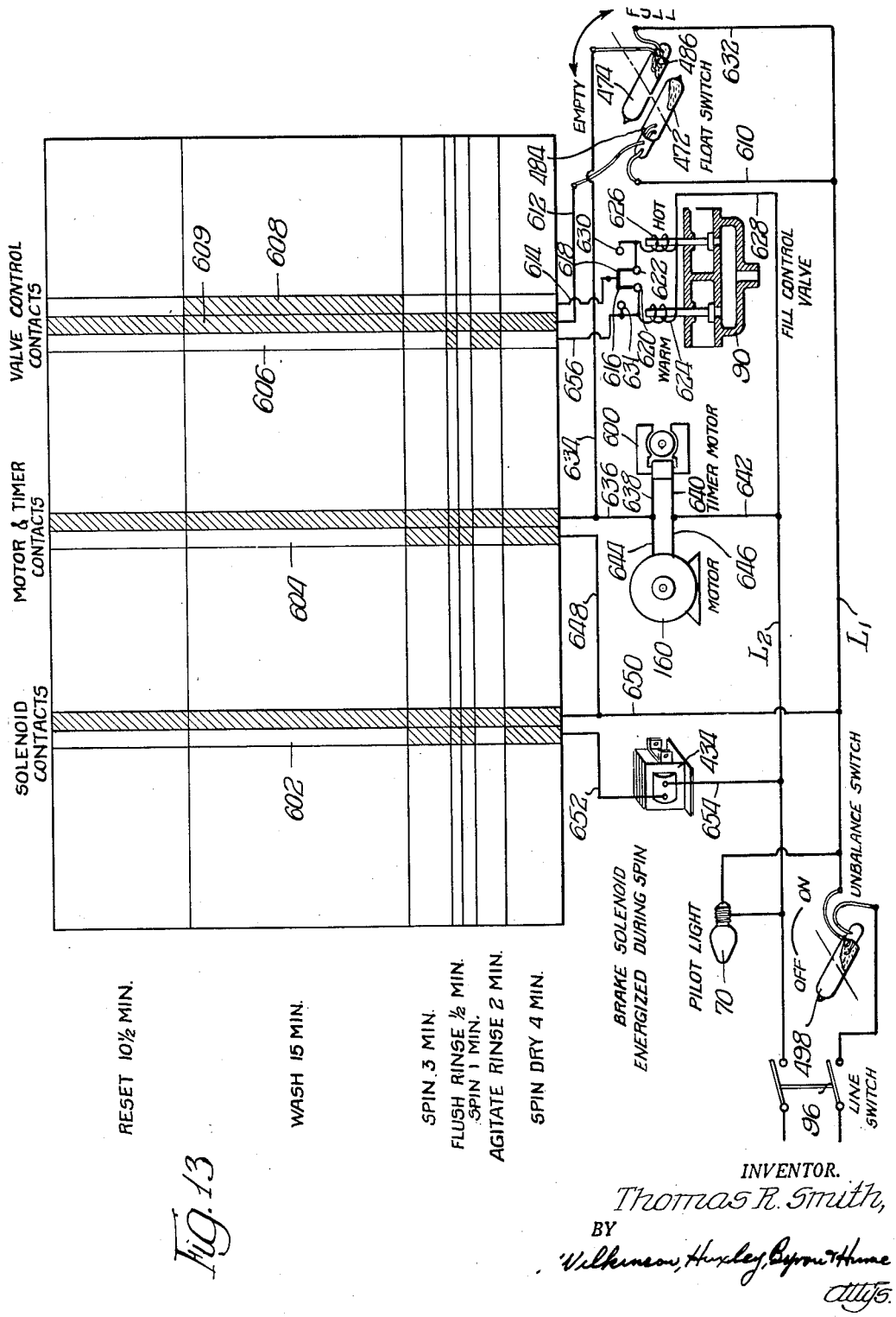

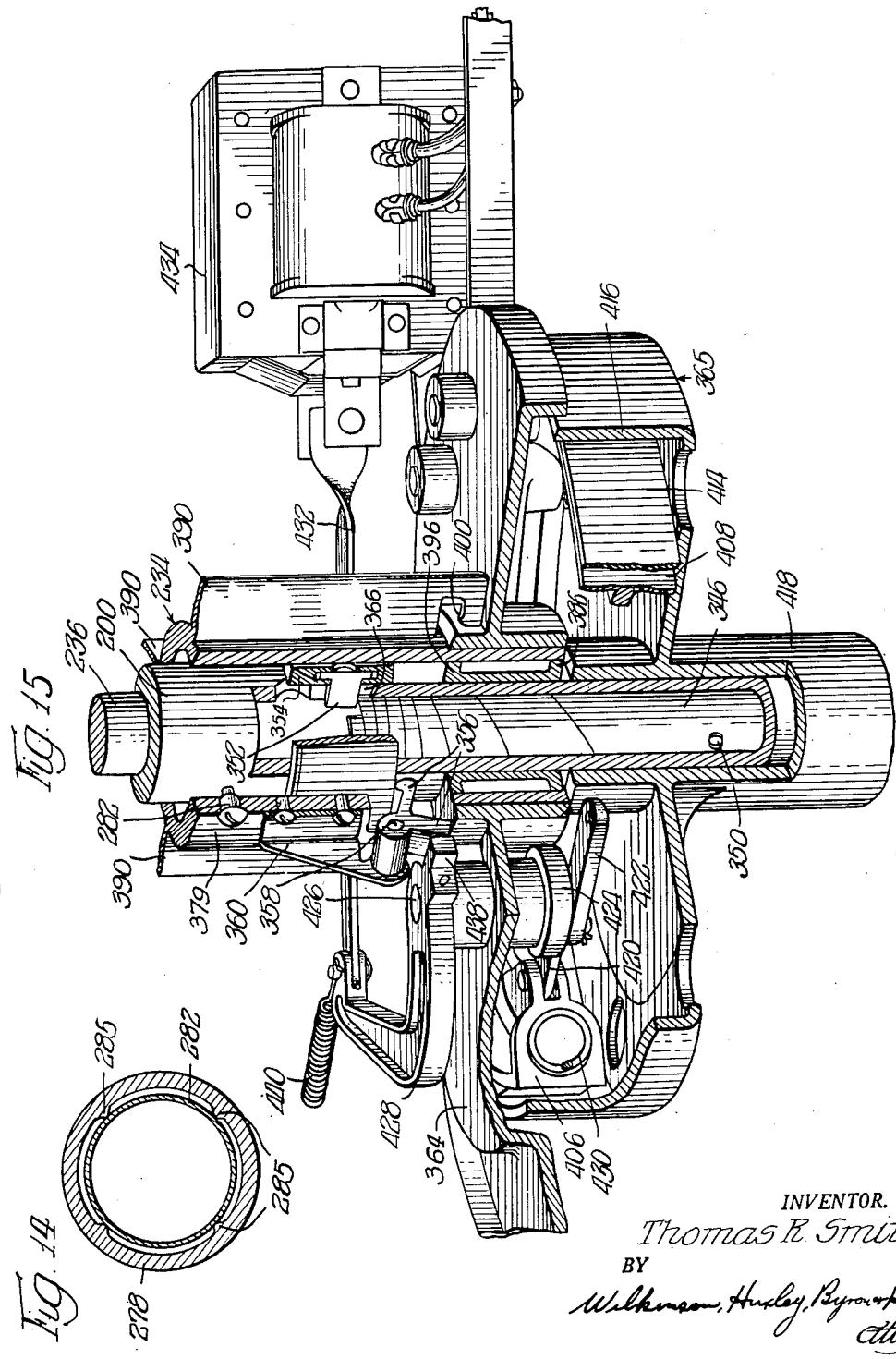

Patented Apr. 21, 1953

2,635,446

UNITED STATES PATENT OFFICE 2,635,446

CONTROL MECHANISM FOR WASHING MACHINES AND THE LIKE

Thomas R. Smith, Newton, Iowa, assignor to The Maytag Company, Newton, Iowa, a corporation of Delaware Original application December 20, 1948, Serial No. 66,230. Divided and this application October 11, 1950, Serial No. 189,520

20 Claims. (Cl. 68—12)

The present invention relates to washing machines, and more particularly to washing machines of the type in which a washing operation is accomplished by agitating the liquid and material contained therein and in which the tub is thereafter rotated to extract the liquid from the material to effect a partial drying thereof.

Among the objects of the present invention is to provide a washing machine of the type specified in which the washing cycle, including the washing of the material, the rinsing thereof, and the extracting of liquid therefrom is automatically controlled.

Another object of the invention is to provide novel control means for automatically and consecutively causing the washing machine to perform steps in a washing operation in timed sequence which may involve the introduction of washing liquid, agitating the clothes or material to be washed, rinsing and spin drying, such control means embodying a float member as one of its novel features which is carried by a supporting structure centrally disposed in said tub and is operated by the liquid therein. The invention comprehends the provision of control mechanism operated by said float member which preferably is carried by the lid for the washing machine.

A further novel aspect of the invention resides in the provision of a control means which initiates the agitation of the clothes in the washing cycle at a desired time interval before a predetermined liquid level in the tub is attained, thus providing a smooth and undisturbed overlapping transitional period between the time when agitation of the clothes is initiated and the time when the liquid supply is rendered inoperative, thus eliminating any tendency of the washing machine to "hunt" during this period in its cycle of operation.

The present application is a division of the parent application Serial No. 66,230, filed December 20, 1948, for Washing Machine.

Other objects, features, capabilities and advantages are comprehended by the invention, as will later appear and as are inherently possessed thereby.

Referring to the drawings:

Figure 2 is an enlarged fragmentary view in vertical cross-section showing a means for supplying liquid to the interior of the rotatable tub;

Figure 3 is a fragmentary view in vertical cross-section of a control device for the washing machine;

Figure 1:
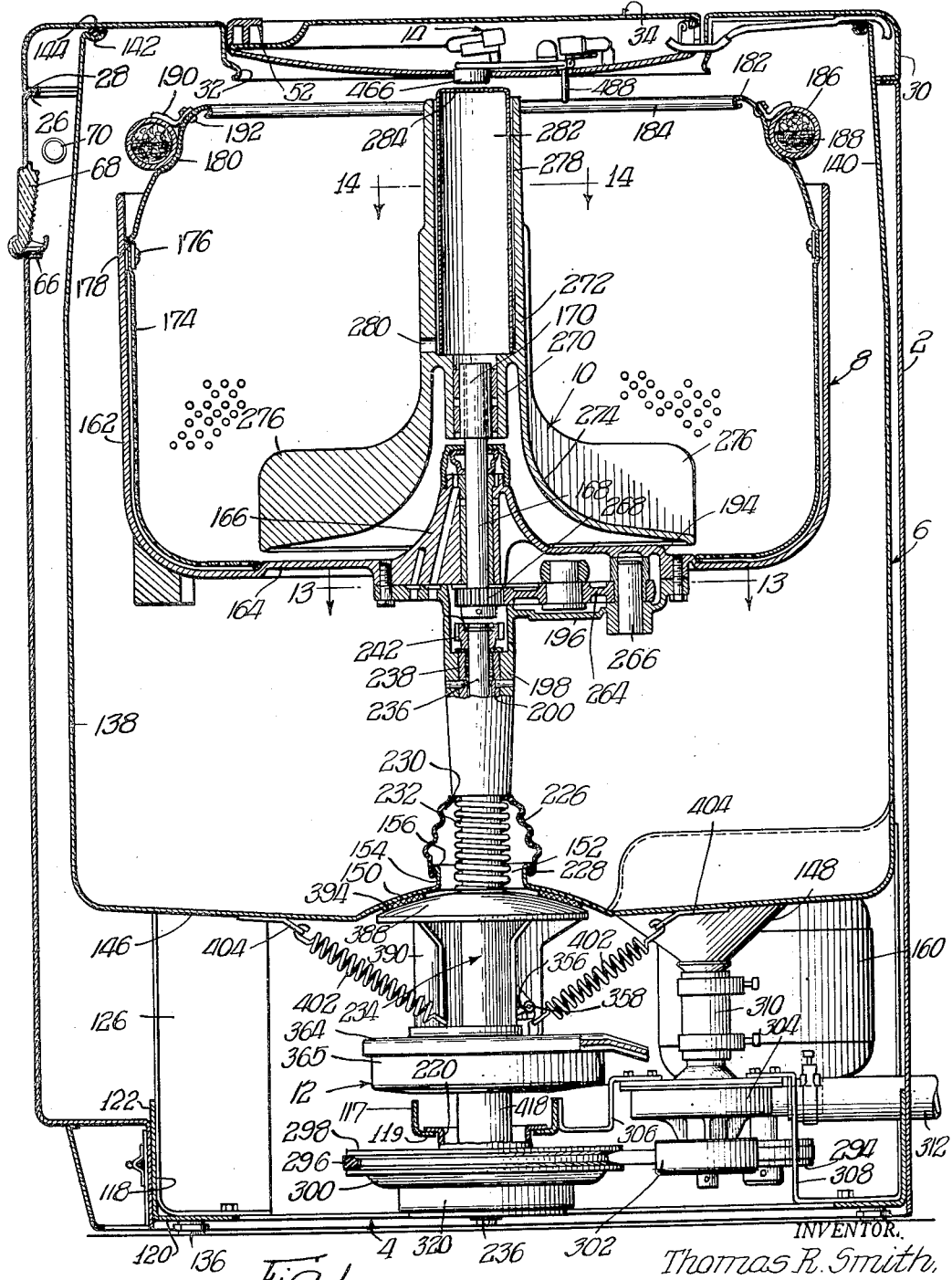
Figure 1 is a vertical cross-sectional view of a washing machine made in accordance with the present invention.

Figures 4 to 9, inclusive, are enlarged fragmentary views, partly in elevation and partly in section, disclosing various modifications of the float control for controlling the operation of the washing machine;

Figure 10 is an enlarged fragmentary view in vertical section of the upper part of the washing assembly, disclosing more in particular the float control and associated control switches mounted in the lid of the washing machine;

Figure 11 is an enlarged fragmentary plan view of the switch control mechanism mounted in the lid as shown in Figure 10 of the drawings;

Figure 12 is a fragmentary view in cross-section similar to Figure 10 but more particularly disclosing the float and switch control assembly in another operative position;

Figure 13 is a diagrammatic disclosure of the control circuit for the washing machine;

Figure 14 is a view in cross-section taken in a plane represented by line 14—14 of Figure 1 of the drawings; and Figure 15 is a partial sectional perspective view of the brake and clutch mechanisms embodied in the automatic washer.

Referring now more in detail to the drawings, a combined washing and drying machine made in accordance with the present invention is shown as generally comprising an outer cabinet 2, a base structure 4 for supporting an outer tub 6 completely enclosed by the cabinet 2. Mounted within the outer tub 6 is a rotatable tub 8 provided with an agitator or washing device 10 therein, the tub 8 and its agitator or washing device 10 being operated by suitable mechanism 12 which, together with the inner tub and agitator assembly, are suitably supported on the base structure 4. As a further characteristic of the washing machine, a control mechanism, generally referred to as 14, is provided for automatically controlling certain operations in the washing cycle.

The cabinet 2 has its main body formed from sheet metal to provide the opposite side panels and back and front panels which may be formed to provide a substantially rectangular unitary structure. The panels are formed with inturned flanges 26 at the upper edges thereof which are adapted to mate with and be secured to similar flanges 28 of the cover or top panel 30 for the cabinet. This cover or top panel 30 is formed with an opening 32 whereby access may be had to the interior of the rotatable tub 8.

The opening 32 is normally closed by a lid 34 formed with a base section 36 and a cover section 38 to provide a chamber or compartment for a plurality of switch assemblies for the control mechanism 14, as will be hereinafter more fully described. Each of the sections 36 and 38 is formed with interfitting flanges, such as 40, at the marginal edges thereof which are adapted to be disposed to form a unitary lid structure. As shown more particularly in Figure 10, the base section 36 is provided with a hinge bracket disposed adjacent the rear edge thereof which comprises upstanding oppositely disposed lugs 42, only one of which is shown, interconnected adjacent the top and rear edge thereof by the transversely disposed bar 44 having a lower wedge surface 46 adjacent the oppositely disposed lugs 42. The rear portion of the top or cover section 38 is formed adjacent its rear edge with spaced lugs 48 which are adapted to be brought into wedging relation to the wedge surfaces 46 for holding the wall sections 36 and 38 of the lid together at this point when moved angularly with respect to one another into assembled relation. The top wall section 38 is formed adjacent the front thereof with a recess 50 adapted to receive a handle 52 which can be gripped by the operator for swinging the lid about its pivot point into and out of its closed position. The two wall sections 36 and 38 are held in assembled relation by means of a pair of screws 54, or the like, which extend through aligned openings provided in the wall sections 36 and 38 and threadedly engage the handle 52 for securing the same within the recess 50. It is apparent that the screws 54 may be readily removed and the wall sections 36 and 38 moved apart for readily gaining access to the interior compartment formed by these wall sections for repairing or replacing any of the switch control assemblies, or any part thereof, mounted therein. The base or lower wall section 36 is provided with apertures 56 and 58 for a purpose to be more fully described hereinafter.

The lid 34 is pivotally mounted with respect to the cover or top wall 30 of the cabinet by means of a hinge element 60 secured to said top wall or cover 30 in any desired manner, the said hinge element having an outer substantially U-shaped end portion terminating in a rolled marginal edge portion 62 suitably threaded at both ends to receive screws 63, or the like, which extend through and are mounted in apertures 64 of the lugs 42, about which the lid pivots when raised and lowered. The outer end portion of the hinge element extends through opening 65 provided in the base 36 which permits moisture to drain from the lid when the same is raised.

The front panel of the cabinet has an opening 66 in which is mounted a panel 68 of translucent material illuminated by means of a pilot light 70 incorporated in the control circuit shown in Figure 12 of the drawings.

Referring to Figure 4 the cover or top wall 30 is further provided with a pair of openings 86, only one of which is shown, through which the shafts of control devices are adapted to extend. The control devices are of somewhat similar construction in that each is provided with a shaft 88 extending up through one of the openings in the cover 30, the same being manipulated by a control knob 104. The control knob disposed in association with one of the openings controls the thermostatically operated mixing valve 90, the said control valve being operable to supply warm, hot, or medium warm water into the rotatable receptacle 8, as will be hereinafter more fully disclosed. The control knob associated with the other opening in the top or cover 30 is adapted to position the cams of a timer motor for automatically effecting a washing operation in cyclic sequence, the said knob, if desired, also embodying the line switch 96 for the main line circuit, as shown in Figure 13 of the drawings.

The control shaft 88 for the timer is threaded adjacent its upper end and is provided with a cut-out portion 98 to form a non-circular portion which extends through an opening 100 of similar shape centrally disposed in a dial 102 whereby the dial 102 is adapted to be moved in unison with the shaft 88. The threaded end of the shaft 88 beyond the dial 104 is adapted to receive the knob 102 provided with an insert 106 which threadedly engages the end of the shaft 88. Disposed below the dial 102 and threadedly engaging the shaft 88 is a lock nut 108 adapted to be adjustably positioned for adjusting the position of the dial and knob with respect to the cover 30. It will be seen that upon rotation of the knob 104 on the shaft 88, the dial 102 will like-wise be rotated by the operator and the timer mechanism is also actuated. This dial is provided with suitable indicia indicating the time intervals for various steps in the washing operation. In the present case the indicia is marked in accordance with the indicated time periods for the various steps in the washing operation, as shown diagrammatically in Figure 13 of the drawings.

The base structure 4 is of rectangular formation and comprises a unitary box structure formed from horizontally disposed L-shaped angle iron sections 118, each of which has a horizontally and inwardly disposed leg or web 120 and a vertically and upwardly extending web or leg 122. The base structure is further provided with corner posts or pedestals 126 formed from angle irons of the desired length which are rigidly secured in position to the horizontally disposed L-shaped angle irons at the corners of the base structure, and each of which is provided with an inturned supporting flange, not shown, adapted to provide a support for the outer tub 6. Extending between and secured to opposite sides of one pair of horizontal legs 120 of the box structure is a channel shaped frame member 117 of arched formation provided with an opening 119 in its central web for supporting the inner tub 8 and its associated mechanisms, as will be hereinafter more fully described. Adjacent each corner of the base structure there is provided a short foot or adjustable leg portion 136 for maintaning all four supporting points of the machine in contact with the floor and at the same time to maintain the machine level.

The outer tub 6 is formed with a side wall having its lower portion 138 cylindrical in horizontal cross-section and its upper portion 140 frusto-conical in shape which terminates in an inwardly extending flange 142 provided with an annular curved recess or groove adapted to receive a toroidal shaped sealing element 144 of resilient and compressible material, such as rubber or the like, which fits within the recess or groove and is compressed against the inner surface of the top wall or cover 30 in spaced relation to the opening 32 thereof to provide a fluid-tight joint therebetween. The outer tub 6 is further formed with a bottom wall 146 sloping inwardly and downwardly from the side wall portion 138 for the purpose of draining liquid falling into the bottom of the outer tub to the conical shaped drain outlet 148 depending from the bottom wall. This bottom wall is further formed with a centrally disposed crowned portion 150 having an opening 152 therein defined by an annular up-standing flange 154 which terminates in an outwardly extending peripheral portion 156 providing a shoulder for a purpose to be hereinafter more fully disclosed.

The inner tub 8 disposed within the outer tub 6 is formed in two sections or parts, the outer part having an imperforate side wall 162 and an imperforate bottom wall 164 formed with a central hub 166 in which a shaft 168 is journaled. This shaft extends above the hub portion 166 and is splined, as at 170, to the agitator 10 which is mounted thereon.

The inner part or section of the tub 8 is in the form of a perforate basket 174, the lower portion of which is disposed in substantially parallel relation to the side and bottom walls 162 and 164 of the outer imperforate part of the tub 8. The inner basket is rigidly secured to the side wall 162 by means of a plurality of screws 176 and is held in spaced relation to the outer imperforate tub by means of the spacing washers 178 to provide a channel which allows the water passing through the perforations to flow between the basket and the outer imperforate tub over the top of the wall 162 without passing through the clothes contained within the inner tub 8. The upper portion 180 of the basket 174 is imperforate and extends upwardly and inwardly and terminates in the rolled edge 182 defining an opening 184 disposed in association with the opening 32 whereby the operator is able to gain access to the interior of the rotatable tub 8 when the lid 34 is lifted.

The upper imperforate portion 180 of the basket has mounted thereon a hollow toroidal shaped tubular member 186 having a body of mobile material 188 of relatively high specific gravity, which assembly serves as a balancing ring. Steel wool or the like may be used to dampen the movement of a fluid in the balancing ring. This balancing ring 186 is secured to the upper wall portion 180 by means of a plurality of clips or brackets 190 secured to said wall portion 180 by means of bolts 192 or the like.

Formed as a part of the bottom wall 164 of the inner receptacle is a gear housing 194 having a cover or closure 196 provided with a downwardly extending hub or hollow supporting member 198 which embraces and is rigidly secured to the upper end of a hollow shaft 200 which extends downwardly through the opening 152 in the bottom wall 146 of the outer tub 6 and the opening 119 in the supporting member 117 and member 117 is mounted upon a radial and thrust bearing (not shown) disposed adjacent the base 4 which in turn is supported by the arched supporting member 117. The radial and thrust bearing may be of any suitable construction and is supported for tilting movement by the anular dish-shaped retaining member 220 which extends downwardly through opening 119 of the channel shaped member 117. Since the tiltable support means forms no part of the invention, a further description is not deemed necessary. This support is clearly set forth in the above mentioned parent application, Ser. No. 66,230.

Leakage between the outer hollow shafts 200 and the outer tub 6 is prevented by means of a seal or boot 226 of resilient and flexible material, such as rubber or the like, which has an enlarged lower marginal edge 228 adapted to snap over and engage the annular shoulder formed by the outwardly extending marginal portion 156 of flange 154. The upper end of the seal 226 is provided with an inwardly extending flange portion 230 having a friction face which bears against the lower end of the supporting hub 198, and pressure is applied to maintain sealing relation by means of a coil spring 232 having its upper end abutting the inwardly extending flange 230 and its lower end abutting a damper assembly 234.

Disposed within the hollow shaft 200 is an inner drive shaft 236 journaled for relative rotation in the outer shaft through an upper bearing 238 and a lower bearing (not shown). Splined to the upper end of the inner shaft 236 is a drive pinion 242 which operates suitable gear reduction mechanism (not shown) to oscillate a segmental gear 264 pivoted for oscillating movement about stud shaft 266 which is fixed to the cover 196. The segmental gear 264 meshes with the pinion 268 mounted upon the lower end of the shaft 168.

In the above construction when the drive shaft 236 is rotated, the shaft 168 and the agitator 10 connected thereto will be oscillated in a to-and-fro direction within the tub 8 through the driving mechanism disposed within the housing 194. For a more complete description of the oscillating mechanism, reference may be had to the above mentioned parent application.

The agitator 10, as hereinbefore described, has its central hub 270 splined to the upper end of shaft 168. The agitator is further formed with a center post 272 and a base or body portion 274 extending downwardly and outwardly from the center post. One or more blades 276 extending upwardly and outwardly from the base portion 274 may be provided to effect a washing operation within the inner tub 8. The central post or pedestal 272 extends upwardly from the base 274 and is formed with an inner chamber or compartment 278 which communicates with the interior of the tub 8 through one or more openings 280. As shown in Figure 1 of the drawings, a float 282 is slidably mounted within the chamber 278 and is adapted to be moved in accordance with the liquid level within the inner tub 8 for operating certain control mechanisms as will be hereinafter more fully described. The float 282 is provided with a lower open end and has its upper end closed by the end wall 284, although other modifications are contemplated by the present invention, as disclosed in Figures 4 to 9, inclusive, which will be hereinafter described in detail. As shown in Figure 14 of the drawings, the center post 272 is provided with a plurality of longitudinally and inwardly extending ribs 285 adapted to position the float 282 and to facilitate relative sliding movement of the float with respect to the center post 272.

The drive shaft 236 is rotated for oscillating the agitator 10 and for rotating the inner tub 8 by means of a pivotally mounted motor 160. The motor 160 is provided with a pulley 294 having a V-shaped groove for driving the belt 296 which passes around and is received within the V-shaped groove 298 of the drive pulley 300. The back side of the belt 296 engages and drives the pulley 302 of a centrifugal liquid discharge pump 304 supported by the brackets 306 and 308 on the base structure 4. This pump communicates with the drain 148 in the outer tub 6 through the conduit 310, the discharge for the pump being through the conduit 312 to any desired place of disposal.

A clutch mechanism which operates to transmit a constant torque between the motor and the inner shaft 236 forms the subject matter of copending applications filed in the name of Thomas R. Smith, now Patents Nos. 2,604,764 and 2,604,765, issued July 29, 1952. The pulley 300 driven by the belt 296 is formed with a downwardly extending and integral cylindrical wall 320 for housing the clutch mechanism.

As previously referred to, the material within the receptacle 8 is subjected to a washing operation through the action of the agitator 10 and also subjected to a centrifuging action whereby the said material is spin dried upon rotation of the tub 8. In order to rapidly rotate the inner tub 8 suitable clutch mechanism is provided for effecting a driving relation between the inner shaft 236 and the outer shaft 200. In the illustrative embodiment of the invention such clutch mechanism takes the form of a spring clutch including an expanding type tapered spring clutch element 346 embracing the shaft 236. The lower end of the spring clutch element 346 is connected to the shaft 236 by means of a pin 350 whereby a driving connection between the shaft 236 and the spring clutch element 346 is effected. The upper actuating end of the spring clutch element is arranged to be engaged by a T-shaped key 352 mounted within the clutch collar 354 for sliding movement within a slot 366 in the outer shaft 200. During the period when the agitator 10 is being operated, the clutch collar 354 is held in an elevated position by means of bell crank lever 356 whereby the key 352 is disengaged from the upper operating end of the spring clutch element 346. When the bell crank lever 356 is tripped, the clutch collar 354 moves downwardly under the action of gravity to position the key 352 in the path of movement of the upper operating end of spring clutch element 346 whereby the said spring clutch element is expanded to frictionally engage the wall of the outer hollow shaft 200 at which time a driving connection is effected between the shafts 200 and 236 to rapidly rotate the inner tub 8.

The bell crank lever 356 is pivoted, as at 358, to a bracket 360 connected to a hollow sleeve 379 constituting a part of the damper mechanism 234 to which is secured a brake shoe support 364 forming an element of brake mechanism 365, to be hereinafter more fully described.

The hollow sleeve 379 is formed with an outwardly extending spherical shaped wall 388, reinforced by the oppositely disposed webs 390, and to the upper surface of which friction material 394 is connected in any suitable manner which frictionally engages or mates with a complementary spherical surface formed on the under side of the central crowned portion 150 of the outer tub 6.

The brake shoe support 364 is formed with a hub 396 secured on the lower end of the hollow sleeve 379. The webs 390, of which four are utilized in the present embodiment, are each provided at their lower end with an aperture 400 engaged by the end of a coil spring 402. Each of these springs is equally loaded and spaced and extends at an angle to the vertical axis of the sleeve 379 and has its opposite end mounted in a bracket 404 rigidly secured to the bottom wall 146 of the outer tub 6. Due to the angular disposition of the springs 402 with respect to the vertical axis of the sleeve 379 and their connection to the brake shoe support 364 and the tub 6, a component of the spring force is applied in a vertical direction to the friction material 394 to reduce the amplitude of horizontal movement of the inner tube under eccentric loading and to tend to return the tub 8 to its neutral or vertical position where the spring forces are all equal.

When the shaft 236 is rotated freely to oscillate the agitator 10 the outer shaft 200 and the tub assembly connected thereto is held against rotation by the friction brake 365. As previously indicated, this friction brake mechanism incorporates the brake shoe support 364 having the brake shoes 406 and 408 pivoted thereto in any suitable manner, the said brake shoes being provided with a brake lining, such as 414, engageable with the inner cylindrical surface of the brake drum 416 having a hub 418 splined to the outer hollow shaft 200. The brake shoes 406 and 408 are pivotally connected through links 420 and 422 to the crank collar 424 secured to the lower end of a pin 426 mounted in the brake shoe support 364. An operating arm 428 is connected to the upper end of the pin 426 whereby the brake shoes, which are normally in engagement with the brake drum 416, may be moved inwardly and out of such engagement when the outer shaft 200 is driven by the inner shaft 236 through the spring clutch element 346. A coil spring 430 is interposed between the brake shoes 406 and 408 to normally maintain said brake shoes in frictional engagement with the brake shoe drum 416. The outer end of the operating arm 428 is connected through a link 432 to a solenoid 434 connected in the control circuit for operating the brake during a washing cycle. The solenoid 434 is normally deenergized while the agitator 10 is operated during which time the brake shoes 406 and 408 maintain the outer sleeve 200 and the tub 8 and its associated mechanisms stationary. The arm 428 is provided with a projection 438 engageable with one leg of the bell crank lever 356 for moving the bell crank lever about its pivot point 358 to maintain the clutch collar 354 in a position whereby the key 352 is disengaged from the operating end of the spring clutch element 346. In order to hold the bell crank lever 356 in a position to render the spring clutch mechanism inoperative, the arm 428 has a coil spring 440 connected thereto which is anchored at its other end in the base structure 4. Upon energization of the solenoid 434, the arm 428 is moved thereby in a clockwise direction, as viewed in Figure 15 of the drawings, to move the projection 438 thereof out of engagement with the bell crank lever 356 thus permitting the bell crank lever 356 to swing about its pivot point and to allow the clutch collar 354 to move downwardly with respect to the shaft 200 whereby the key 352 engages the spring clutch element 346 to effect a driving connection between shafts 236 and 200. The brake mechanism 365 may be held against torsional movement when the brake is applied by suitable mechanism as described in the above mentioned parent application.

Washing fluid is delivered from the thermostatically controlled mixing valve 90 to a conduit 454 which extends upwardly within the chamber between the cabinet 2 and the outer tub 6 and is connected at its upper end in any desired manner to an injector tube 456. The injector tube is formed as an integral part of a U-shaped bracket 458 which is secured to the outside of the outer tub 6 on opposite sides of an opening 460 provided therein. Secured to the inside of the outer tub 6 in communicating relation to the opening 460 is an inlet spout 462 which extends inwardly from the outer tub 6 in overhanging relation to the inner tub 8 and terminates in a discharge opening adapted to introduce washing fluid into said inner tub 8. A screen 464 is secured within the inlet spout adjacent its discharge end for breaking up the stream of washing liquid to produce a soft, non-splashing flow thereof into the inner tub 8.

The injector tube 456 is spaced from the inlet spout 462 by an air gap which is capable of interrupting the flow of washing liquid into the inner tub 8 should a drop in pressure occur in the line, thus preventing any possibility of a return of dirt or contaminated water into the supply system. In order to prevent water from falling into the operating mechanism at the bottom of the casing 2, a drip basin 457 is connected to the tub 6 below the injector tube 456, the same having an outlet passage 459 formed in the tub 6 whereby any water falling downwardly from the injector tube 456 is conducted into said tub.

As previously described, the float 282 is operated in accordance with the liquid level within the inner tub 8 for operating control mechanism, generally referred to as 14, which has certain control elements mounted within the lid 34 of the washing device. While the specific illustration of the invention contemplates the mounting of this float within the recess provided in the center post for the agitator, nevertheless, the invention comprehends the mounting of such a float within a center post or supporting structure irrespective of whether or not the same is in any way associated with the agitator or other washing means disposed within the tub 8. The float 282, according to the disclosure in Fig. 1 and Figures 10 and 12, inclusive, is adapted, upon the washing liquid attaining a predetermined height in the receptacle 8, of moving a control button 466 which extends through opening 56 in the base section 36 of the lid into the path of movement of the float 282. This control button is secured adjacent one end of a lever arm 468 which is pivoted at its other end, as at 470, in a bracket 480 secured, as at 482, to the base section 36. A bracket 475 is pivotally mounted, as at 476 and 478 on the bracket 480 and provides a support for two control switches 472 and 474 of the mercury type, the said bracket 475 being moved about its pivot points 476 and 478 by the lever 468 which is adapted to engage the same when moved by the float 282. The mercury switches 472 and 474 are mounted in the bracket 475 with their longitudinal axes angularly disposed with respect to one another for a purpose to be hereinafter more fully described, and have their contacts 484 and 486 oppositely disposed, as more clearly shown in Figure 13 of the drawings. As shown in Figure 10 of the drawings, the button 466 is in its lowermost position, indicating that the inner tub 8 is empty or that the liquid level in the tub is ineffective to raise the button 466. Under such circumstances the contacts 484 of switch 472 are bridged by the mercury contained in the switch, whereas the contacts 486 are not bridged by the mercury in switch 474, which is at that time disposed at the lower end of the switch. However, upon introduction of a washing liquid into the inner tub 8 to a predetermined level the button 466 is engaged by the float 282 and is raised into engagement with the switch bracket 475, causing the said bracket to pivot about the pivot points 476 and 478 into the position as shown in Figure 12 of the drawings, whereby the switch 472 is rendered inoperative and switch 474 has its contacts 486 bridged by the mercury contained therein. The results accomplished by angularly disposing the switches 472 and 474 with respect to each other and the operation of the switches in the control circuit, as shown in Figure 13, will be more fully described hereinafter.

Mounted for pivotal movement about the pin 470 and extending downwardly through the opening 58 in the base section for the lid and in opposite relation to the center post 272 is a safety shut-off lever 488 having a latch 489 provided with an inturned upper end portion 490. Mounted for pivotal movement, as at 492 and 494 on the bracket 480, is a bracket 496 on which is mounted a safety shut-off switch 498 of the mercury type held in operative position by means of the inturned end 490 of the latch 489 which engages the shoulder 500 of the bracket 496. The switch 498, as will be hereinafter more fully described, is included in the main line circuit and when moved to inoperative position, renders the entire electric circuit inoperative to stop the washing machine. The inter-engagement of the inturned end 490 and shoulder 500 is normally maintained by a coil spring 502 connected at one end to the latch 489 and at its other end to the post 504 extending upwardly from the base section of the lid.

The lever 488 extends downwardly below the base section 36 for the lid in opposite and spaced relation to the center post 272 for the agitator so that when the center post assembly, during the spinning or rotation of the inner tub 8, wobbles or gyrates to move the tub 8 an excessive distance laterally from its normal vertical position due to an unbalanced load condition within the container 8, the center post 272 engages the lever 488 to move the latch 489 against the action of spring 502 which releases the bracket 496 for downward movement by gravity about the pivot points 492 and 494 which renders the switch inoperative, thus breaking the main electric circuit and stopping the entire machine. The switch 498 also has its contacts disposed adjacent the pivot points 492 and 494 so that the switch is inoperative when the lid is raised, thus deenergizing the entire circuit and making it impossible for the operator to operate the washing machine until the lid is again closed. This arrangement provides a safety device which eliminates any possibilities of injuring the operator during the washing cycle, particularly when the inner tub 8 is rotated at a high rate of speed. The switch 498 is pivoted in such a manner that when the lid is raised, the bracket 496 will automatically swing back into a reset position whereby the inturned end 490 engages shoulder 500 of the bracket so that when the lid is closed the mercury for the switch 498 bridges the contacts thereof and the switch is again in position to act as a safety unbalance shut-off switch should gyratory movements of the inner tub become excessive due to unbalanced loadings. In the event that the latch 489 is tripped due to such unbalanced loading, all the operator has to do is to open the lid to reset the safety switch and to again close the lid, after which the machine continues to operate in its normal cycle of operation.

With particular reference to the float control hereinabove described, it may be pointed out that in the past, in automatic washing machine constructions of the vertical axis type provided with an inner tub for washing and centrifuging and an outer tub for receiving the washing liquid, certain types of controls have been used for determining the wash water level in the inner tub, one of which comprises the use of a constant flow orifice and using a timer device to control the length of time the water flows in order to meter a certain amount of water into the tub. Another procedure is to provide a float control in the outer tub which necessitates the use of a recirculation pump, the water level in the inner tub being determined by said float control in the washing cycle. According to the first method, there are many disadvantages in that differences in water pressure lead to inaccurate measurement of the amount of water introduced into the washing tub and, under certain conditions, it is possible for the washing cycle to proceed without any liquid whatsoever in the tub. The second method likewise has similar disadvantages. Such an assembly requires recirculating pump valves and connections which must be serviced and maintained in operative condition. Furthermore, the float is inaccessibly located in the outer tub which cannot be easily and readily serviced to remove the lint and dirt which necessarily collects thereon.

The present invention is particularly adapted to the vertical axis type of automatic washing machine which has the inner tub supported for rotation substantially about its vertical axis. In accordance with the present invention, it is not necessary that a vertically disposed agitator be used in the washing machine as long as it is possible to have a center supporting structure which can carry the float either on the inside of the structure or on the outside of the structure and so that the float can be used for operating a control mechanism which is conveniently located in the center of the lid. The control mechanism in the lid may be mechanical or electrical for regulating the flow of liquid into the tub and/or controlling one or more operations in the automatic washing cycle.

As will be apparent, the provision of a float carried by a center post structure has the advantage that the same can be readily removed for cleaning. Where the float is placed within the center post the same is not disturbed by circulation or movement of the clothes or washing liquid within the tub although, as will be apparent, it is always essential that the center post be properly vented to the interior of the tub so that the float will actually register the water level within the said tub.

It will also be apparent that the wobbling or gyratory movement of the rotating tub or the reciprocation of the agitator will not interfere with the proper operation of the float. When the tub is being rotated, the water will be rapidly thrown out over the upper edge of the side wall 162 of the inner tub 8 and out of the float chamber 278 whereby the float will become inactive. Under such circumstances the float does not contact the actuator disposed in the center of the lid so that the oscillation and a high speed of spin normally will not cause any rubbing or friction on said actuator.

Modifications of the float assembly are contemplated by the present invention, certain of such modifications being disclosed in Figures 4 to 9, inclusive. In Figure 4, the inner receptacle 506 is provided with an agitator having a center post 508 formed with a central chamber or recess 510 communicating, through one or more openings 512, with the interior of the receptacle 506. Mounted within the recess 510 is the float 514, its open end being closed by the cap 516 overlapping the upper end of the center post 508 whereby the float may be readily grasped by the operator and removed for cleaning the same, as well as the center post, when desired. This float is adapted to operate the control button 518 mounted in the lid 520 which is hinged to a cabinet or casing 522 much on the order of the structure hereinbefore described.

Figure 5 discloses a washing machine conforming substantially to that shown in Figure 4 except for slight modifications in structure of the center post 524 which is provided with an interior chamber 526 communicating, through one or more openings 528, with the interior of the tub 506. The float 530 of this modification is built on the order of the float shown in Figure 1 of the drawings except that the same embraces the center post 524 instead of being mounted within the chamber or recess as in the modification shown in Figure 1 of the drawings.

In Figure 6, there is disclosed a washing machine conforming substantially to that shown in Figure 4 wherein the center post 508 is provided with the inner chamber 510 communicating, however, with the interior of the tub 506 through one or more openings 532 provided in the lower wall defining the chamber 510 instead of in the side wall of the center post. In this modification, the float 534 has its ends closed and is formed with an annular recess 536 providing oppositely disposed shoulders for limiting the axial movement of the float with respect to the center post 508. The limiting means is constituted by a flexible band of material 538, such as rubber or the like, which embraces the center post 508 and has a plurality of spaced projections 540 extending through openings 542 in the center post. These projections extend into the annular recess 536 and are adapted to engage the end walls thereof for limiting movement of the float with respect to the center post.

Figure 7:
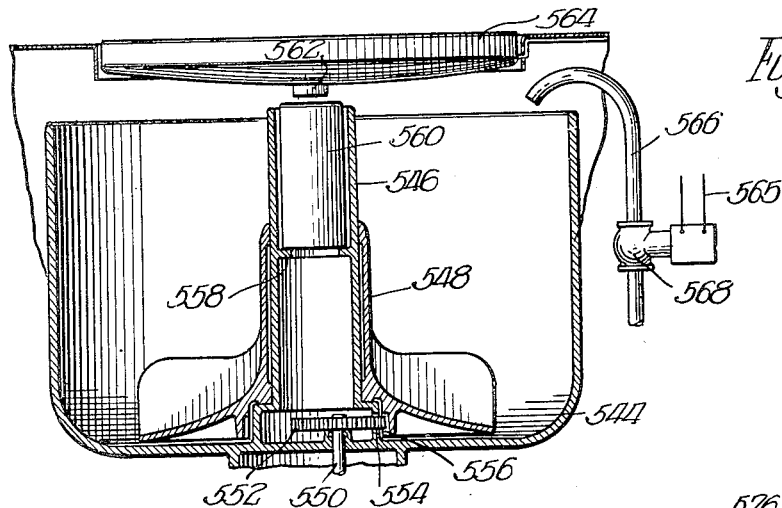

In Figure 7 there is disclosed still another modificaion of the invention, the same comprising the inner rotatable receptacle 544 which is provided with an upstanding centrally disposed post 546 upon which is mounted an agitator 548. The agitator is operated by means of a shaft 550 mounted in the lower wall of the tub 544 and has a gear 552 mounted on the upper end thereof which extends through an opening 554 in the center post 546 and engages an internal gear 556 mounted in or formed integrally with the agitator 548, whereby the agitator may be oscillated for effecting a washing operation in the tub 544. The center post 546 is formed with an inwardly extending annular shaped flange 558 which provides a seat for the float 560 and permits washing fluid from the interior of the tub 544 to act upon the float 560 for moving the same to operate an actuating device 562 mounted in the lid 564 of the washing device. Means operated by said actuating device 562 is electrically connected in a circuit 565 of an electrically operated valve 568 for controlling flow of liquid into the tub 544 through an intake 566.

Figure 8:
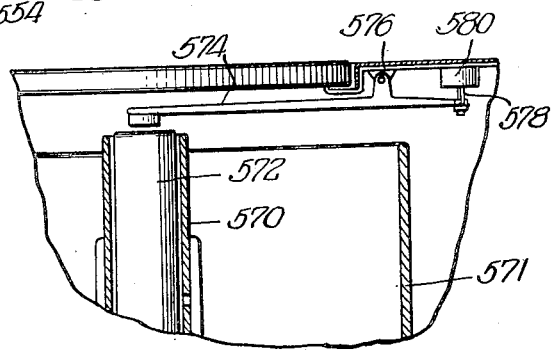

Figure 8 discloses a further modification of the invention, the same comprising a hollow center post 570 extending upwardly within a rotatable tub 571 and being apertured as in the previously described embodiments. Mounted within the center post 570 is a float 572 which is adapted to engage one end of a lever 574 pivoted, as at 576, to the cabinet or casing for the washing machine. The other end of the lever has an operating element 578 for operating a switch 580 whereby the one or more steps in the washing cycle may be controlled.

Figure 9:
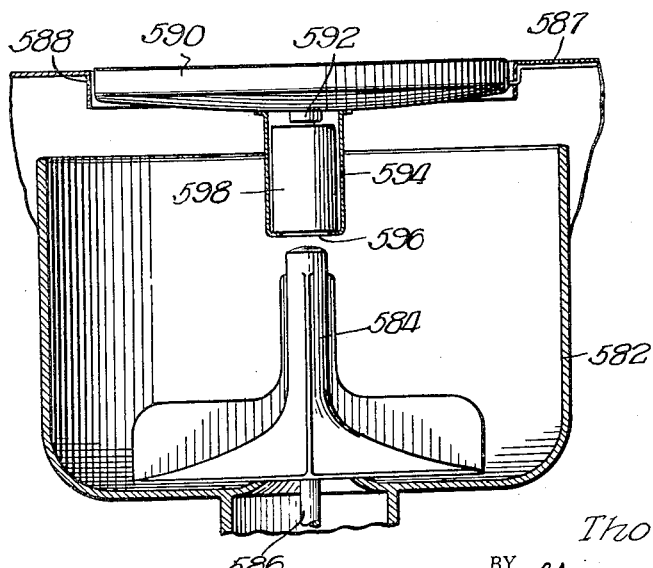

Figure 9 of the drawings discloses still another modified structure for the washing machine, the same comprising a rotatable tub 582 in which is disposed an agitator 584 operated by means of a shaft 586 for effecting a washing operation within the tub. The washing machine of this embodiment is provided with a cabinet or casing 587 having an opening 588 whereby the operator is able to gain access to the interior of the tub 582. The opening 588 is normally closed by a lid 590 having control mechanism mounted therein which includes an operating member 592 extending downwardly therefrom through an opening therein much on the order of that shown in Figure 1 of the drawings. The lid 590 has a downwardly extending hollow member 594, the interior of which communicates with the interior of the tank through an opening 596 provided in the bottom wall thereof. The member 594 is secured to the lid 590 so as to enclose the operating member 592 and has a float 598 mounted therein for operation of said control member 592. This float 598 is moved in accordance with the liquid level in the tub 582 to operate the control mechanism through the control member 592.

In those instances where the float chamber is provided in the agitator, it was found that more satisfactory performance was obtained when a single passage was provided from the interior of the tub into the float chamber. This effectively retards the transfer of fluid fluctuation from the tub into the float chamber and thereby stabilizes the float.

In order to automatically operate the machine hereinabove described, there is provided a control means including a timer motor capable of rotating a plurality of cams for actuating switch means in a predetermined sequence to cause the apparatus to perform its various functions. A control circuit for causing the washing machine to operate automatically is disclosed in Figure 13 of the drawing, the same including a switch 96 which may be mounted in the control device for the circuit and which controls the main circuit $L^1$ and $L^2$. The main circuit includes a timer motor 600, the main driving motor 160, the mixing valve 90, the brake solenoid 434, the float switches 472 and 474, the unbalance switch 498 and the pilot light 70. The pilot light 70 is directly connected across the lines $L^1$ and $L^2$ and is lighted when the line switch 96 is closed except when the unbalance switch 498 is rendered inoperative either because of the lid 34 being in open position or because of the disengagement of latch 489 from the shoulder 599 as a result of the excessive unbalanced or eccentric loads in the receptacle 8 which has caused the center post 272 to engage the lever 488. As will be noted, the unbalance switch 498 is incorporated in the main line $L^1$. The remaining pieces of control mechanism are connected directly to one side of the line through contacts operated by a plurality of cams 602, 604, 606 and 608 which are driven in one direction only by the timer motor 600.

The sequence of operation includes a period during which liquid is introduced into tub 8, a washing period, a spin period during which a flush rinse is applied for a short interval of time to remove soapy water from the clothing and tub, an agitate rinse period, a spin period for spin drying the clothes or material within the tub 8 and a reset or inactive period. As previously described, switches 472, 474 and 498 are disposed within the lid 34. When the tub is empty and the lid 34 is closed, the switch 472 is in its closed position whereas the switch 474 is in its open position. The unbalance switch 498 is also in its closed position. At this time the brake solenoid 434 is deenergized and the brake shoes 406 and 408 are urged into frictional engagement with the drum 416 by the spring 430 whereby the outer shaft 200 and the tub 8 are held stationary. When the line switch 96 is closed and the knob 104 of the control device is moved to initiate a washing cycle, a circuit is completed whereby water from the mixing valve 90 is introduced through the conduit 454 and nozzle 462 into the tub 8. The mixing valve 90 is constructed to introduce either warm, hot or medium hot water into the receptacle 8. The control circuit, however, is arranged so that for the washing period only a selection may be made by the operator as to whether warm, hot or medium hot water is to be introduced into the tub 8. The circuits for the introduction of these wash waters can be traced through main line $L^1$, conductor 610, contacts 484 of switch 472, conductor 612, to one of the contacts 609 of cam 608 (this being common to both cams 606 and 608), the other contact of cam 608 being connected through the conductor 614 to the movable contacts 616 and 618 of the switch for the mixing valve 90. When it is desired to introduce medium hot water into the tub 8 the control knob 104 is moved to position the contacts 616 and 618 in engagement with the contacts 620 and 622, respectively, as shown in Figure 13 of the drawings. Accordingly, the circuit for the introduction of medium hot water into tank 8 is completed through the solenoids 624 and 626 of the warm and hot water valves, respectively, and thence through the conductor 628 to the main line $L^2$. In the event that it is desired to introduce hot water into the tub 8, the control knob 104 for the mixing valve 90 is moved to its "hot" position at which time the circuit from cam 608 is completed through the conductor 614, contacts 618 and 630, solenoid 626 of the hot water valve, and thence through conduit 628 to the main line $L^2$. In the event that it is desired to introduce warm water into the tub, the control knob 104 for the mixing valve 90 is moved to its "warm" position, at which time the circuit from cam 608 is completed through the other contact for cam 606, conductor 656, contacts 620 and 631, solenoid 624, and thence through the conductor 628 to the main line $L^2$. Irrespective of the positioning of the knob 104, the control circuit during the flush and agitate rinse periods is such that warm water only can be introduced into the tub 8. This circuit can be traced from the main line $L^1$, conductor 610, contacts 484 of switch 472, conductor 612 to contact 609 for the cam 606, the other contact for the cam 606 being connected through conductor 656 to the solenoid 624 and thence by way of conductor 628 to the main line $L^2$.

Water is introduced into the tub 8 until such time as a predetermined liquid level is attained, at which time the float 282 rises and contacts the control button 466 which moves the lever arm 468 about its pivot point 470 and at the same time moves the switch bracket 475 about its pivot points 476 and 478. This operation causes switch 474 to be energized which immediately completes a circuit for starting the timer motor 600 and the driving motor 160. This circuit may be traced through the main line L¹, conductor 632, contacts 486, conductor 634, conductor 636, conductor 638 to the field winding for the timer motor 600 and thence through the conductors 640 and 642 to the main line L². The circuit for the driving motor 160 is also completed through the switch 474 in the same manner as the circuit for the timer motor, the conductor 636 being connected by conductor 644 to the field winding for the motor 160 and thence through the conductors 646 and 642 to the main line L². Energization of these motor circuits starts the timer motor to operate whereby the cams rotated thereby take over control of the sequential operation of the machine. The driving motor 160 operates the driving mechanism heretofore described for oscillating the agitator 10, it being understood that at this time the tub 8 and the outer shaft 200 are maintained stationary by the brake shoes as previously described.

Preferably, the switches 472 and 474 in the circuit heretofore described are angularly offset with respect to each other and the volume of mobile conducting fluid contained in the casings therefor is such that the motor circuits through the switch 474 are energized prior to the time when the level of the washing liquid within the tub 8 has attained a predetermined height found desirable for the washing operation, so that agitation of the clothes or other materials within the tub 8 is initiated prior to the time when the mixing valve 90 is closed. It will be apparent that because of the relative angular disposition of the switches 472 and 474 and the volume of mobile conducting material for the switches that a short time after agitation is effected switch 472 is deenergized which shuts off the flow of liquid into tub 8 independently of the operation of timer motor 600.

As the timer motor continues to operate, the cams 602, 604 and 606 are progressively moved forward. At the end of the washing period, motor circuits through the contacts for cam 604 are completed for spinning the tub 8, these circuits being entirely independent of the switches 472 and 474. The circuit for the timer motor may be traced from the main line L² through conductors 642 and 640 to the field winding for the timer motor 600, thence through conductors 638 and 636 to one of the contacts for the control cam 604 and thence through the other contact therefor and conductors 648 and 650 to the main line L¹, thus completing a circuit whereby the timer motor continues to operate and to move its cams through their cycle of operation. The circuit for the drive motor 160 can be traced from the main line L², conductors 642 and 646, through the field winding for the motor 160, conductors 644 and 636 to one contact of the control cam 604 an thence from the other contact for said control cam through conductors 648 and 650 to the main line L¹.

A circuit is also completed at this time for energizing the solenoid 434 to release the brake shoes 406 and 408 and to move the lever 428 whereby its projection 438 is disengaged from the bell crank lever 356 to permit the clutch collar 354 to move downwardly under the action of gravity to effect an engagement of the key 352 and the operating end of the clutch spring 346. Thus the outer shaft 200 is operatively connected to the inner shaft 236 through the spring clutch element 346 whereby the tub 8 may be rapidly rotated for causing the washing liquid to be discharged from the clothes or material contained therein. This circuit can be traced from the main line L¹ through conductor 650 through one of the contacts of the control cam 602 through the other contact for the control cam through conductor 652 to the winding for the solenoid 434 and thence from the said winding through conductor 654 to the main line L².

During this period of spin, cam 606 is moved to complete the circuit through the conductor 656 and solenoid 624 as previously described and warm water is introduced through the mixing valve 90 into the tub 8, whereby the material and clothes are flush rinsed during the spinning operation.

Water overflowing from the tub 8 during the spinning operation is discharged into the outer tub 6 and flows through the discharge opening 148 and into the intake conduit 310 for the pump 304. This pump, operated through the belt 296, discharges the water extracted from the clothes or other material in the tub 8 through the conduit 312 to drain.

At the end of the spinning period hereinabove described, the circuit for the solenoid 434 is deenergized, thus allowing brake 365 to operate to hold the tub 8 stationary during the agitate rinse period. When the spinning period is terminated, control cam 606 causes a circuit to be completed through switch 472 whereby warm rinse water is introduced into the tub 8 while the tub is at rest. The circuit for the introduction of warm rinse water is the same as the circuit for introducing rinse water during the spinning period. After a predetermined liquid level has been attained in the tub 8, the float 282 engages the button 466 to energize switch 474 to complete a circuit as was done during the washing cycle to oscillate the agitator 10 and to deenergize switch 472.

As the timer motor 600 continues to operate, the operation of agitator 10 is discontinued, at which time the brake solenoid 434 is again energized through the circuit previously described for releasing the brake shoes 406 and 408 from the drum 416 and to again permit clutch element 346 to effect a driving connection between the inner shaft 236 and the outer shaft 200 whereby the motor 160 rapidly spins the tub 8 for extracting the rinse water from the clothes or other materials contained in the tub 8. The control circuit for the motor 160 at this time is independent of either of the switches 472 or 474 and is traced in the same manner as the circuit heretofore traced for the previous spin period.

At the end of the spin period, continued operation of the timer motor moves the control cams into their reset or inactive position, at which time the drive motor 160 is rendered inoperative and the brake solenoid 434 is deenergized whereby the brake shoes 406 and 408 engage the brake drum 416 to hold the tub 8 stationary and to recondition the entire control circuit for a repetition of the cyclic operation as hereinabove described.

The unbalance switch 498 is normally held in closed position by means of the latch 489 when the lid 34 is in closed position and is operative to open the main line circuit L¹ and to close the same under the conditions previously described.

In the operation of the washing and drying machine according to the disclosure heretofore presented, the operator opens the lid 34 and places the clothes or other material to be washed into the tub 8 and then pours the proper quantity of detergent into the said tub. The lid is closed and the water temperature is selected by positioning the water selector knob of the control for the mixing valve 90. If medium hot water is desired, the temperature selecting knob on the top of the machine is positioned as shown in Figure 13 of the drawings. The timer control knob, also mounted on the top or cover of the cabinet, may be pulled outwardly to close the line switch 96 after which the same is rotated to a position corresponding to the length of time desired for the washing period as shown by indicia on the knob. This is the only manual operation that is required by the operator.

When the timer control knob is turned, cam 608 for the timer is turned to a position whereby water is supplied by the mixing valve 90 to the tub 8 through conduit 454 and nozzle 462. Water continues to flow into the tub 8 until such time as the float 282 rises and engages button 466 to move the switch 474 to closed position, all as hereinbefore explained. This energizes the timer and drive motor circuits whereby the timer starts to operate for rotating the control cams driven thereby to effect a cycle of operation in accordance with the operation of the control circuit. At this time the solenoid is deenergized so that brake shoes 406 and 408 are in engagement with the brake drum 416 to hold the tub 8 and the outer shaft 200 stationary and, because of the positioning of the operating lever 428 of the brake mechanism, its extension 438 is in engagement with the bell crank lever 356 whereby the key 352 is out of engagement with the operating end of the spring clutch element 346. Accordingly, the motor 160 operating through its belt 296 rotates pulley 300 and through the constant torque slip clutch, the inner shaft 236 is rotated to oscillate the agitator 10 through the oscillating mechanism disposed within the casing 194. Because of the particular construction of switches 472 and 474 and their relative angular disposition, water will continue to be introduced into the receptacle 8 until a predetermined desired liquid level is attained. This level is determined by optimum washing conditions within the tub 8 and although it has been pointed out that a lag may exist between the time when the switch 474 is energized and switch 472 is deenergized, nevertheless, under certain circumstances it may be desirable to have such energization and deenergization of these switches occur substantially simultaneously which would result in causing agitation to take place in the tub 8 simultaneously with the discontinuance of flow of liquid from the mixing valve 90. Under the conditions of operation assumed in the illustrative embodiment of the invention, water will continue to flow for a short time into the tub 8 although agitation for washing has already started through the operation of switch 474.

After the agitator has been operated to effect a washing operation within the tub 8 for a predetermined length of time, continued rotation of the control cams 602 and 604 completes circuits for spinning the tub for a predetermined length of time. One of such circuits is controlled by cam 602 and includes the solenoid 434, as previously traced, which energizes the same to release the brake shoes and at the same time causes the projection 438 to disengage the bell crank lever 356 whereby the collar 354 drops to permit key 352 to engage with the operating end of the spring clutch element 346. The other of the circuits is controlled by the cam 604 and includes the motor 160. The motor 160, accordingly, continues to operate to drive the outer shaft 200 from the inner shaft 236 through the clutch element 346. Such rotation of the outer shaft 200 causes the entire tub assembly connected thereto to rotate while the agitator 10 is maintained stationary with respect to the tub. As the speed of rotation of the tub 8 increases and the water therein is forced up along the side walls 162, the same is discharged over the upper edge of the tub into the bottom of the stationary tub 6 where the same is discharged through the outlet 148 to drain.

During the spinning operation hereinabove described, warm water is introduced into the tub 8 through the mixing valve 90 to flush rinse the clothes therein, the circuit for the operation of the mixing valve 90 being completed through the switch 472, as hereinbefore described. It is at this time that fresh water is admitted to the rotating tub to remove a relatively high percentage of the soap remaining in the clothes after washing. This rinse water is discharged over the upper edge of the tub 8 into the tub 6 and then to drain by means of the pump 304.

At the termination of the spinning period, cam 602 causes deenergization of the solenoid circuit whereby the clutch element 346 is rendered inoperative and brake shoes 406 and 408 are set to bring the tub 8 to a stop. The inner shaft 236 is then free to be rotated independently of the outer shaft 200. At this time the circuit for the motor 160 and timer motor 600 is deenergized. Simultaneously with the deenergization of this circuit for the motors, cam 606 is effective to complete a circuit to initiate introduction of warm water into the tub 8 to be utilized in the agitate rinse period.

Water for this rinsing operation is introduced into the tub 8 until the float 282 is actuated to deenergize switch 472 and to energize switch 474. Energization of switch 474 completes the circuit, as previously described, to operate motor 160 and the timer motor 600 to cause the agitator 10 to be oscillated whereby the clothes or other materials within the tub 8 are thoroughly agitated for a brief period of time. Continued operation of the timer motor 600 positions cams 602 and 604 to complete circuits including the solenoid 434 and the motor 160 independently of the switches 472 and 474, as hereinbefore described, whereby the outer shaft 200 driven by the inner shaft 236 through the clutch element 346 and the tub 8 are gradually brought up to spinning speed to permit the material within the tub to be centrifuged until a large portion of the moisture has been removed therefrom. This completes the washing cycle after which the timer is moved into its reset or inactive position to deenergize the control circuit and to bring the tub 8 to rest. The lid 34 may then be raised by the operator to remove clothes or other materials from the tub 8. During this cycle of operation the material which was placed in the tub is subjected to a washing operation, a centrifuging action to remove water therefrom, a flush rinse to remove soapy water therefrom during rotation of the tub, a rinse followed by agitation, and finally a centrifuging action to remove a large percentage of water therein.

While the illustrative embodiment of the invention has been described in connection with a control circuit for operating the washing machine in a cycle of operation determined by the control cams of the timer motor, nevertheless, it will be clearly appreciated that it is possible to use the control device for the timer motor in such a way as to manually position the control cams for operating the various mechanisms incorporated in the machine. Furthermore, if so desired, the machine can be very readily made to operate semi-automatically.

While I have herein described and upon the drawings shown illustrative embodiments of the invention, it is to be understood that the invention is not limited thereto but may comprehend other constructions, arrangements of parts, details and features without departing from the spirit of the invention.

It is claimed:

1. In a washing machine, the combination of a tub adapted to receive liquid and material to be washed, means for effecting a washing operation within said tub, means for controlling a step in said washing operation, an upstanding hollow center support mounted within said tub, to provide a float chamber, said chamber having communication with the interior of said tub through an opening, a float member movably mounted within said chamber and operated by the liquid in said tub, and means operable by said float when a predetermined liquid level has been reached in said tub for effecting operation of said control means.

2. In a washing machine, the combination of a tub adapted to receive liquid and material to be washed, a lid for said tub, means for effecting a washing operation within said tub, means for controlling a step in said washing operation, a center support mounted within said tub, a float member carried by said support and operated by the liquid in said tub, and means mounted in said lid and operable by said float when a predetermined liquid level has been reached in said tub for effecting operation of said control means.

3. In a washing machine, the combination of a tub adapted to receive liquid and material to be washed, a lid for said tub, means for effecting a washing operation within said tub, means for supplying a liquid to said tub, a center support mounted within said tub, a float member carried by said support and operated by the liquid in said tub, and means mounted in said lid and operable by said float when a predetermined liquid level has been reached in said tub for shutting off said liquid supply means.

4. In a washing machine, the combination of a tub adapted to receive liquid and material to be washed, an agitator having a center post providing means for mounting said agitator within said tub and being operable to effect a washing operation therein, said center post having a hollow support apertured to provide communication with the interior of said tub, a float member carried within said support and operated by the liquid in said tub, means for supplying a liquid to said tub, and means operable by said float when a predetermined liquid level has been reached in said tub for shutting off said liquid supply means.

5. In a washing machine, the combination of a tub adapted to receive liquid and material, a washing device within said tub, a center support mounted within said tub, a float member carried within said support and operated by the liquid in said tub, and means operable by said float when a predetermined liquid level has been reached in said tub for initiating the operation of said washing device.

6. In a washing machine, the combination of a tub adapted to receive liquid and material to be washed, a washing device within said tub, means for supplying a liquid to said tub, a movable float responsive to the liquid level in said tub and means sequentially operated by said float when predetermined liquid levels are reached in said tub for initiating operation of said washing device and for shutting off said liquid supply means.

7. In a washing machine, the combination of a tub adapted to receive liquid and material to be washed, means for effecting a washing operation within said tub, timing means for controlling said operation, a center support mounted within said tub, a float member carried by said support and operated by the liquid in said tub, and means operable by said float when a predetermined liquid level has been reached in said tub for starting the operation of said timing means.

8. In a washing machine, the combination of a tub adapted to receive liquid and material to be washed, means for supplying liquid to said tub, means for effecting a washing operation within said tub, timing means for controlling said operation, and means sequentially operated in accordance with predetermined liquid levels in said tub for starting the operation of said timing means and for rendering said liquid supply means inoperative.

9. In a washing machine, the combination of a tub adapted to receive liquid and material to be washed, means for supplying liquid to said tub, automatic control means for successively causing liquid to be supplied to said tub, the starting of the washing, and the stopping of the washing including control means for said liquid supply means and timing means for controlling the washing operation, manually operable means for initiating operation of said automatic control means, and means sequentially operated in accordance with predetermined liquid levels in said tub for starting the operation of said timing means and for rendering said control means for said liquid supply means inoperative.

10. In a washing machine, the combination of a tub adapted to receive liquid and material to be washed, a lid for said tub, means for effecting a washing operation within said tub, a control circuit including means for controlling the supply of liquid to said tub and timing means for controlling a series of steps in said washing operation in timed sequence, a center support mounted in said tub, and a float member carried by said support and operated by the liquid in said tub, said control circuit having switch means mounted in said lid and operated by said float member in accordance with the liquid level in said tub for starting the operation of said timing means and for rendering said liquid supply means inoperative.

11. In a washing machine, the combination of a cabinet having a top wall formed with an opening, a tub disposed within said cabinet and adapted to receive liquid and material to be washed, a lid for said opening, means for effecting a washing operation within said tub, a center support mounted within said tub, a float member carried by said support operated by the liquid in said tub, and control means for said washing machine carried by said lid and operated by said float member.

12. In a washing machine, the combination of a cabinet having a top wall formed with an opening, a tub disposed within said cabinet and adapted to receive liquid and material to be washed, a hollow lid for said opening, means for effecting a washing operation within said tub, said means including a centrally disposed agitator having a center support, a float member carried by said center support and operated by the liquid in said tub, control means for said washing machine including a control circuit having switch means mounted within said lid, and means carried by said lid and extending into the path of movement of said float member for controlling said switch means.

13. In a washing machine, a receptacle for liquid and fabrics to be treated, means for discharging liquid into the receptacle, an electro-responsive valve for controlling the flow of liquid through said means, a float disposed in said receptacle, and an electric float actuated switch disposed above the float and receptacle for controlling the valve when the liquid reaches a predetermined level in said receptacle to interrupt the flow of liquid to the same.

14. In a liquid level control for a washing machine, comprising a receptacle for retaining washing liquid, an actuator disposed in the bottom of said receptacle and having an upwardly projecting hollow center post, a float disposed in said hollow center post, a cover for said receptacle, a conduit having a valve therein for discharging liquid into said receptacle, and a movable switch device carried by said cover and disposed over said float when the cover is in closed position, said switch being movable by said float when the liquid attains a predetermined level to interrupt the flow of liquid to said receptacle.

15. In a washing machine, a substantially imperforate receptacle for washing liquid and fabrics to be treated, an oscillatable agitator disposed in said receptacle and having an upstanding hollow center post projecting above the normal liquid level to provide a float chamber, said agitator being provided with an opening to admit liquid from said receptacle to said float chamber, a hollow float disposed in said chamber and movable in response to the liquid flowing in said chamber, a lid for said receptacle and movable to an open and closed position, a tiltable switch carried by said lid and disposed above said float when the lid is in closed position, a conduit for discharging liquid into said receptacle, electro-responsive valve means disposed in said conduit for controlling the flow of liquid to said receptacle, and an electrical means disposed between said switch and valve, said switch being movable by said float when the liquid in the chamber reaches a predetermined value to interrupt the electrical circuit to the valve to close the same and responsive below the predetermined level to energize the valve to open position.

16. In a washing machine, a receptacle having a washing compartment open at its upper end and substantially imperforate therebelow, a conduit having an electro-responsive valve therein for discharging liquid into the receptacle, an oscillatable agitator disposed in the lower end of said receptacle and having an integral hollow center post terminating adjacent the upper end of the receptacle, said hollow center post providing an elongated chamber separate from said washing compartment and being provided with an opening therein intermediate the bottom and open end of the chamber to permit liquid to flow therethrough during the fill period, a hollow float disposed in said chamber, a lid disposed above the open end of the receptacle and movable to a horizontal closed position and a vertical open position, a pivotally mounted switch means secured to the underneath portion of the lid, a bracket for holding said switch, a projection carried by said bracket projecting downward over the float, and electrical means between the switch and valve to maintain the valve closed when the lid is opened and to open the valve when the lid is closed, and said switch being operated by the float acting against the projection to close the valve when the liquid flowing through the opening from the receptacle to the chamber reaches a predetermined level.

17. In a washing machine operating on an automatic cycle, a receptacle substantially imperforate below a predetermined level, a conduit having an electro-responsive valve therein for conducting liquid to the receptacle, an oscillatable agitator disposed in said receptacle having an upstanding centrally located hollow center post to provide a float chamber, said center post being provided with a restricted passage therein to permit flow of liquid in the receptacle to said chamber, a lid movable from a vertical open position to a horizontal closed position disposed above the receptacle and adapted to cover the same, a movable and pivotable bracket carried under the lid and disposed above the float, a pair of switches mounted on said bracket, a pin secured to the bracket and projecting toward the float, means including mechanism for actuating the agitator for agitating the liquid and fabrics in said receptacle, means for removing the liquid from the receptacle and extracting a portion of the same from the fabrics, and means including a timer for causing the mechanism to operate in a cyclic manner, a knob for operatively positioning said timer, and means connecting the pair of switches to the timer so that when the lid is in its open position one of the switches deenergizes the timer independently of its setting and when the lid is in its closed position the other switch holds the timer deenergized until the level of liquid reaches a predetermined value and the float actuates the switch to energize the timer and hence the mechanism for completing the cycle.

18. In a washing machine, a stationary casing having a cover portion provided with an access opening, a lid pivoted to cover said opening when in closed position, switch means carried by said lid, a receptacle disposed below said opening adapted to receive water and material to be washed and mounted for lateral displacement with respect to said lid and switch means, a washing device in said receptacle, a float carried by said washing device and laterally movable with said receptacle and movable vertically by the water level in said receptacle to actuate said switch means, means for admitting water to said receptacle, and means for actuating said washing device, both of said means being controlled when the float rises in response to the water level in the receptacle to actuate said switch means to thereby start operation of said washing device and to interrupt the flow of water to said receptacle.

19. In a washing machine, the combination of a tub adapted to receive liquid and material to be washed, an agitator having a center post providing means for mounting said agitator within said tub and being operable to effect a washing operation therein, said center post having a hollow support apertured to provide communication with the interior of said tub, a control member carried within said support movable in response to changes in the level of liquid in said tub, means for supplying liquid to said tub, and means operable by said control member when a predetermined liquid level has been reached in said tub for shutting off said liquid supply means.

20. In a washing machine, the combination of a tub adapted to receive liquid and material, a washing device within said tub, a center support mounted within said tub, a control member carried within said support movable in response to changes in the level of the liquid in said tub, and means operable by said control member when a predetermined liquid level has been reached in said tub for initiating the operation of said washing device.

THOMAS R. SMITH.

References Cited in the file of this patent

UNITED STATES PATENTS

| Number | Name | Date |
|---|---|---|
| 1,236,530 | Balzer | Aug. 14, 1917 |
| 2,227,077 | Geldhof | Dec. 31, 1940 |
| 2,449,634 | Baade | Sept. 21, 1948 |
| 2,346,259 | Hutchings | Apr. 11, 1949 |
| 2,498,885 | Geldhof | Feb. 28, 1950 |

FOREIGN PATENTS

| Number | Country | Date |
|---|---|---|
| 477,254 | Great Britain | Dec. 21, 1937 |